3,492,320
13-POLYCARBONALKYL-17-HYDROXYGONA-
17-NITRITE ESTERS
Robert C. Smith, King of Prussia, Reinhardt P. Stein, Conshohocken, and Herchel Smith, Wayne, Pa., assignors to American Home Products Corporation, New York, N.Y., a corporation of Delaware
No Drawing. Filed June 22, 1967, Ser. No. 647,929
Int. Cl. C07c 169/26; A61k 17/06
U.S. Cl. 260—397.4                                    11 Claims

ABSTRACT OF THE DISCLOSURE

The compounds of the class of 13-polycarbonalkyl-17-hydroxygona-17-nitrite esters useful as hypotensive agents.

BACKGROUND OF THE INVENTION

This invention relates to the field of new physiologically active 13 - polycarbonalkyl-17-hydroxygonane, 17-nitrite esters and novel processes for their preparation.

The preparation of 17-nitrite estrane and 17-nitrite androstane esters having estrogenic and cholesterol lowering properties is disclosed by E. P. Oliveto in U.S. Patent 3,127,406.

SUMMARY OF THE INVENTION

More particularly, this invention is directed to compounds of the formulae:

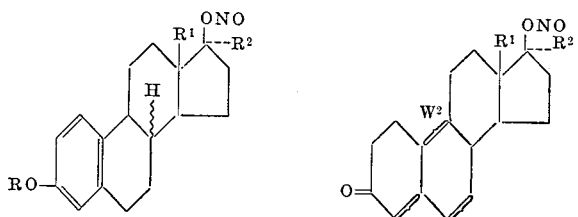

wherein ($\updownarrow$) represents the alpha or beta position; R is selected from the group consisting of alkyl of less than 5 carbon atoms and cycloalkyl of 5 to 6 carbon atoms; $R^1$ is an alkyl group of 2 to 5 carbon atoms; $R^2$ is selected from the group consisting of hydrogen and alkyl of less than 5 carbon atoms; W is selected from the group consisting of a double-bond and a saturated linkage between C4 and C5; $W^1$ is selected from the group consisting of a double-bond and a saturated linkage between C6 and C7; and $W^2$ is selected from the group consisting of a double-bond and a saturated linkage between C9 and C10.

The final product of this invention are physiologically active substances which are useful as hypotensive agents.

The compounds of the present invention can be prepared and administered to warm-blooded animals in a wide variety of oral and parenteral dosage forms.

For preparing pharmaceutical compositions from the physiologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents: it can also be an encapsulating material. In powders the carrier is a finely divided solid which is in admixture with the finely divided compound. In the tablet the compound is mixed with carrier having the necessary binding properties in sutiable proportions and compacted in the shape and size desired. The powders and tablets preferably contain from 5 to 10 to 99% of the active ingredient. Suitable solid carriers are magnesium carbonate, magnesium stearate, talc, sugar, lactose, pectin, dextrin, starch, gelatin tragacanth methyl cellulose sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methyl cellulose, sodium carboxymethyl cellulose and other well known suspending agents.

Preferably, the pharmaceutical preparation is in unit dosage form. In such form, the preparation is sub-divided in unit doses containing appropriate quantities of the compound, the unit dosage form can be a packaged preparation, the package containing discrete quantities of preparation, for example, packeted powders of vials or ampules.

The unit dosage form can be a capsule, cachet or tablet itself or it can be the appropriate number of any of those in package form. The quantity of compound in a unit dose of preparation may be varied or adjusted from a 1 mg. to 100 mg. according to the particular application and the potency of the active ingredient.

In therapeutic use, the preparations are administered at the initial dosage of about 5 mg. to 25 mg. per kilogram daily. The dosages, however, may be varied depending upon the requirements of the patient.

DESCRIPTION OF THE PREFERRED EMBODIMENTS

The compounds of this invention may be prepared according to the process of this invention which may be represented by the following reaction scheme wherein $R^1$, $R^2$, W, $W^1$ and $W^2$ are as hereinbefore defined:

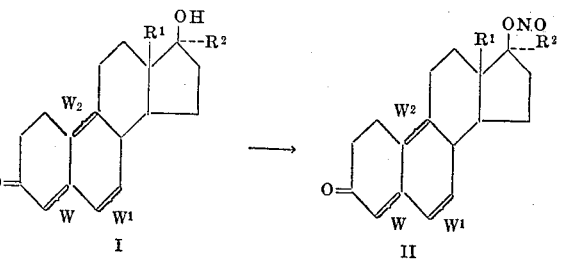

According to one feature of this invention 13-polycarbonalkyl-17-hydroxygon-3-one compounds of the Formula I are treated with nitrosyl chloride in a basic organic solvent, such as pyridine, to yield the 13-polycarbonalkyl-17-hydroxy-3-one, 17-nitrite esters of Formula II.

The initial 13 - polycarbonalkyl-17-hydroxygon-3-one compounds (I) may be prepared in accordance with any prior art processes such as described by G. A. Hughes et al. in U.S. Patent 3,202,686, G. C. Buzby et al. in J. of Med. Chem. 9, 338–341 (1966) and H. Smith et al. in J. Chem. Soc. 4472 (1964).

In accordance with another feature of this invention 13-polycarbonalkyl - 17 - hydroxy-8($\updownarrow$)-3-alkoxygona-1,3,5 (10)-triene compounds may be similarly treated with nitrosyl chloride in a basic organic solvent to yield the corresponding 17-nitrite esters.

These initial 13 - polycarbonalkyl-17-hydroxy-8(ξ)-3-alkoxygona-1,3,5(10)-triene compounds may be prepared by any conventional process such as described in said U.S. Patent 3,202,686 and said J. of Med. Chem.

The following examples illustrate the invention (all temperatures being in centigrade):

EXAMPLE 1

13-ethyl-3-methoxygona-1,3,5(10)-trien-17β-ole, nitrite 10.0 gm. of 13-ethyl-3-methoxygona-1,3,5(10)-trien-17β-ol is dissolved in 250 ml. of pyridine and cooled to —15° C. by immersion in a bath of ice-methanol. Nitrosyl chloride is passed as a gas through the solution for 1 hour. The resulting dark brown solution is stirred at —15° for an additional 1.5 hours and then poured onto 750 gm. of ice. The mixture is filtered and the resulting yellow solid is purified by dissolving in methylene chloride and treating with charcoal. The mixture is filtered and the solvent is evaporated in vacuo to yield 10.2 gm. of 13-ethyl-3-methoxygona-1,3,5(10)-trien-17β-ol, nitrite as a yellow solid; M.P. 89–93°. Further purification by trituration with ethanol and filtration gives M.P. 94–97°;

$\lambda_{max.}^{KBr}$ 6.13μ

Analysis.—Calcd. for $C_{20}H_{27}NO_3$: C, 72.92; H, 8.26; N, 4.25. Found: C, 73.19; H, 8.33; N, 4.27.

EXAMPLE 2

13-propyl-3-methoxygona-1,3,5(10)-trien-17β-ol, nitrite

Following the procedure of Example 1, but substituting 13-propyl-3-methoxygona-1,3,5(10)-trien-17β-ol for 13-ethyl-3-methoxygona-1,3,5(10)-trien-17β-ol there is obtained 13 - propyl-3-methoxygona-1,3,5(10)-trien-17β-ol, nitrite.

EXAMPLE 3

13-butyl-3-methoxygona-1,3,5(10)-trien-17β-ol, nitrite

Following the procedure of Example 1, but substituting 13 - butyl - 3-methoxygona-1,3,5(10)-trien-17β-ol for 13-ethyl-3-methoxygona-1,3,5(10)-trien-17β-ol there is obtained 13 - butyl - 3-methoxygona-1,3,5(10)-trien-17β-ol, nitrite.

EXAMPLE 4

13-isobutyl-3-methoxygona-1,3,5(10)-trien-17β-ol, nitrite

Following the procedure of Example 1, but substituting 13-isobutyl-3-methoxygona-1,3,5(10)-trien-17β-ol for 13-ethyl-3-methoxygona-1,3,5-(10)-trien-17β-ol there is obtained 13-isobutyl-3-methoxygona-1,3,5(10)-trien-17β-ol, nitrite.

EXAMPLE 5

13-ethyl-3-ethoxygona-1,3,5(10)-trien-17β-ol, nitrite

Following the procedure of Example 1, but substituting 13-ethyl-3-ethoxygona-1,3,5(10)-trien-17β-ol for 13-ethyl-3-methoxygona-1,3,5(10)-trien-17β-ol there is obtained 13-ethyl-3-ethoxygona-1,3,5(10)-trien-17β-ol, nitrite.

EXAMPLE 6

13-ethyl-3-propoxygona-1,3,5(10)-trien-17β-ol, nitrite

Following the procedure of Example 1, but substituting 13 - ethyl - 3-propoxygona-1,3,5(10)-trien-17β-ol for 13-ethyl-3-methoxygona-1,3,5(10)-trien-17β-ol there is obtained 13 - ethyl - 3-propoxygona-1,3,5(10)-trien-17β-ol, nitrite.

EXAMPLE 7

13-propyl-3-ethoxygona-1,3,5(10)-trien-17β-ol, nitrite

Following the procedure of Example 1, but substituting 13 - propyl - 3-ethoxygona-1,3,5(10)-trien-17β-ol for 13-ethyl-3-methoxygona-1,3,5(10)-trien-17β-ol there is obtained 13 - propyl - 3-ethoxygona-1,3,5-(10)-trien-17β-ol, nitrite.

EXAMPLE 8

13-ethyl-3-methoxy-8α-gona-1,3,5(10)-trien-17β-ol, nitrite

Following the procedure of Example 1, but substituting 13-ethyl-3-methoxy-8α-gona-1,3,5(10)-trien-17β-ol for 13-ethyl-3-methoxygona-1,3,5(10)-trien 17β-ol there is obtained 13-ethyl-3-methoxy-8α-gona-1,3,5(10)-trien-17β-ol, nitrite.

EXAMPLE 9

13-propyl-3-methoxy-8α-gona-1,3,5(10)-trien-17β-ol, nitrite

Following the procedure of Example 1, but substituting 13 - propyl-3-methoxy-8α-gona-1,3,5(10)-trien-17β-ol for 13-ethyl-3-methoxygona-1,3,5(10)-trien-17β-ol there is obtained 13-propyl-3-methoxy-8α-gona-1,3,5(10)-trien-17β-ol-nitrite.

EXAMPLE 10

13-butyl-3-methoxy-8α-gona-1,3,5(10)-trien-17β-ol, nitrite

Following the procedure of Example 1, but substituting 13-butyl-3-methoxy-8α-gona-1,3,5(10)-trien-17β-ol for 13-ethyl-3-methoxygona-1,3,5(10)-trien-17β-ol there is obtained 13-butyl-3-methoxy-8α-gona-1,3,5(10)-trien-17β-ol, nitrite.

EXAMPLE 11

13-ethyl-3-ethoxy-8α-gona-1,3,5(10)-trien-17β-ol, nitrite

Following the procedure of Example 1, but substituting 13-ethyl-3-ethoxy-8α-gona-1,3,5-trien-17β-ol for 13-ethyl-3-ethoxy-8α-gona-1,3,5(10)-trien-17β-ol, there is obtained 13-ethyl-3-ethoxy-8α-gona-1,3,5,(10)-trien-17β-ol, nitrile.

EXAMPLE 12

13-ethyl-17β-hydroxygon-4-en-3-one, nitrite 5.0 gm. of 13-ethyl-17β-hydroxygon-4-en-3-one is dissolved in 250 ml. of pyridine and cooled to —15° C. in an ice-methanol bath. Nitrosyl chloride is passed as a gas through the solution for one hour. The reaction mixture is stirred at —15° for an additional 2 hours. The reaction mixture is then poured onto ice (1000 g.), the precipitate is filtered and washed with ethanol to give 5.0 gm. of 13-ethyl-17β-hydroxygon-4-en-3-one, nitrite; M.P. 119–122°;

$\lambda_{max.}^{KBr}$ 6.0μ and 6.13μ; $\lambda_{max.}^{EtOH}$ 238 mμ (ε 18,700)

Analysis.—Calcd. for $C_{19}H_{27}NO_3$: C, 71.89; H, 8.57; N, 4.41. Found: C, 71.59; H, 8.47; N, 4.51.

EXAMPLE 13

13-propyl-17β-hydroxygon-4-en-3-one, nitrite

Following the procedure of Example 12, but substituting 13 - propyl - 17β-hydroxygon-4-en-3-one for 13-ethyl-17β-hydroxygon-4-en-3-one there is obtained 13-propyl-17β-hydroxygon-4-en-3-one, nitrite.

EXAMPLE 14

13-butyl-17β-hydroxygon-4-en-3-one, nitrite

Following the procedure of Example 12, but substituting 13-butyl-17β-hydroxygon-4-en-3-one for 13-ethyl-17β-hydroxygon-4-en-3-one there is obtained 13-butyl-17β-hydroxygon-4-en-3-one, nitrite.

EXAMPLE 15

13-isobutyl-17β-hydroxygon-4-en-3-one, nitrite

Following the procedure of Example 12, but substituting 13-isobutyl-17β-hydroxygon-4-en-3-one, for 13-ethyl-17β-hydroxygon-4-en-3-one there is obtained 13-isobutyl-17β-hydroxygon-4-en-3-one, nitrite.

EXAMPLE 16

13-ethyl-17β-hydroxygona-4,6-dien-3-one, nitrite

Following the procedure of Example 12, but substituting 13-ethyl-17β-hydroxygona-4,6-dien-3-one for 13-ethyl- 17β-hydroxygon-4-en-3-one there is obtained 13-ethyl-17β-hydroxygona-4,6-dien-3-one, nitrite.

EXAMPLE 17

13-ethyl-17β-hydroxygona-4,9-dien-3-one, nitrite

Following the procedure of Example 12, but substituting, 13-ethyl-17β-hydroxygona-4,9-dien-3-one for 13-ethyl-17β-hydroxygon-4-en-3-one there is obtained 13-ethyl-17β-hydroxygona-4,9-dien-3-one, nitrite.

EXAMPLE 18

13-ethyl-17β-hydroxygonan-3-one, nitrite

Following the procedure of Example 12, but substituting 13-ethyl-17β-hydroxygonan-3-one for 13-ethyl-17β-hydroxygon-4-en-3-one there is obtained 13-ethyl-17β-hydroxygonan-3-one, nitrite.

EXAMPLE 19

13,17α-diethyl-17β-hydroxygon-4-en-3-one, nitrite 2.0 gm. of 13,17α-diethyl-17β-hydroxygon-4-en-3-one is dissolved in 200 ml. of pyridine and cooled to −15° C. with an ice-methanol bath. Nitrosyl chloride is passed as a gas through the solution for 1 hour. The resulting dark brown solution is stirred at −15° for an additional 2 hours. The reaction mixture is then poured onto ice (500 g.) and filtered. The resulting yellow solid is washed with water and ethanol. Further purification by recrystallization from ether yielded 13,17α-diethyl-17β-hydroxygon-4-en-3-one, nitrite, M.P. 102–104°;

$\lambda_{max.}^{KBr}$ 5.95 and 6.19μ; $\lambda_{max.}^{EtOH}$ 238 mμ (ε 18,200)

Analysis.—Calcd. for $C_{21}H_{31}NO_3$: C, 73.00; H, 9.05. Found: C, 73.26; H, 9.04.

EXAMPLE 20

13-propyl-17α-ethyl-17β-hydroxygon-4-en-3-one, nitrite

Following the procedure of Example 19, but substituting 13-propyl-17α-ethyl-17β-hydroxygon-4-en-3-one for 13,17α-diethyl-17β-hydroxygon-4-en-3-one there is obtained 13-propyl-17α-ethyl-17β-hydroxygon-4-en-3-one, nitrite.

EXAMPLE 21

13-butyl-17α-ethyl-17β-hydroxygon-4-en-3-one, nitrite

Following the procedure of Example 19, but substituting 13-butyl-17α-ethyl-17β-hydroxygon-4-en-3-one for 13,17α-diethyl-17β-hydroxygon-4-en-3-one there is obtained 13-butyl-17α-ethyl-17β-hydroxygon-4-en-3-one, nitrite.

EXAMPLE 22

13-isobutyl-17α-ethyl-17β-hydroxygon-4-en-3-one, nitrite

Following the procedure of Example 19, but substituting 13-isobutyl-17α-ethyl-17β-hydroxygon-4-en-3-one for 13,17α-diethyl-17β-hydroxygon-4-en-3-one there is obtained 13-isobutyl-17α-ethyl-17β-hydroxygon-4-en-3-one, nitrite.

EXAMPLE 23

13-ethyl-17α-methyl-17β-hydroxygon-4-en-3-one, nitrite

Following the procedure of Example 19, but substituting 13-ethyl-17α-methyl-17β-hydroxygon-4-en-3-one for 13,17α-diethyl-17β-hydroxygon-4-en-3-one there is obtained 13-ethyl-17α-methyl-17β-hydroxygon-4-en-3-one, nitrite.

EXAMPLE 24

13-ethyl-17α-propyl-17β-hydroxygon-4-en-3-one, nitrite

Following the procedure of Example 19, but substituting 13-ethyl-17α-propyl-17β-hydroxygon-4-en-3-one for 13,17α-diethyl-17β-hydroxygon-4-en-3-one there is obtained 13-ethyl-17α-propyl-17β-hydroxygon-4-en-3-one, nitrite.

EXAMPLE 25

13-ethyl-17α-butyl-17β-hydroxygon-4-en-3-one, nitrite

Following the procedure of Example 19, but substituting 13-ethyl-17α-butyl-17β-hydroxygon-4-en-3-one for 13,17α-diethyl-17β-hydroxygon-4-en-3-one there is obtained 13-ethyl-17α-butyl-17β-hydroxygon-4-en-3-one, nitrite.

EXAMPLE 26

13-butyl-17α-methyl-17β-hydroxygon-4-en-3-one, nitrite

Following the procedure of Example 19, but substituting 13-butyl-17α-methyl-17β-hydroxygon-4-en-3-one for 13,17α-diethyl-17β-hydroxygon-4-en-3-one there is obtained 13-butyl-17α-methyl-17β-hydroxygon-4-en-3-one, nitrite.

EXAMPLE 27

13-propyl-17α-butyl-17β-hydroxygon-4-en-3-one, nitrite

Following the procedure of Example 19, but substituting 13-propyl-17α-butyl-17β-hydroxygon-4-en-3-one for 13,17α-diethyl-17β-hydroxygon-4-en-3-one there is obtained 13-propyl-17α-butyl-17β-hydroxygon-4-en-3-one, nitrite.

EXAMPLE 28

13,17α-dipropyl-17β-hydroxygon-4-en-3-one, nitrite

Following the procedure of Example 19, but substituting 13,17α-dipropyl-17β-hydroxygon-4-en-3-one for 13,17α-diethyl-17β-hydroxygon-4-en-3-one there is obtained 13,17α-dipropyl-17β-hydroxygon-4-en-3-one, nitrite.

EXAMPLE 29

13,17α-dibutyl-17β-hydroxygon-4-en-3-one, nitrite

Following the procedure of Example 19, but substituting 13,17α-dibutyl-17β-hydroxygon-4-en-3-one for 13,17α-diethyl-17β-hydroxygon-4-en-3-one there is obtained 13,17α-dibutyl-17β-hydroxygon-4-en-3-one, nitrite.

EXAMPLE 30

13,17α-diethyl-17β-hydroxygonan-3-one, nitrite

Following the procedure of Example 19, but substituting 13,17α-diethyl-17β-hydroxygonan-3-one for 13,17α-diethyl-17β-hydroxygon-4-en-3-one there is obtained 13,17α-diethyl-17β-hydroxygonan-3-one, nitrite.

EXAMPLE 31

13,17α-diethyl-17β-hydroxygona-4,6-dien-3-one, nitrite

Following the procedure of Example 19, but substituting 13,17α-diethyl-17β-hydroxygona-4,6-dien-3-one for 13,17α-diethyl-17β-hydroxygon-4-en-3-one there is obtained 13,17α-diethyl-17β-hydroxygona-4,6-dien-3-one, nitrite.

EXAMPLE 32

13,17α-diethyl-17β-hydroxygona-4,9-dien-3-one, nitrite

Following the procedure of Example 19, but substituting 13,17α-diethyl-17β-hydroxygona-4,9-dien-3-one for 13,17α-diethyl-17β-hydroxygon-4-en-3-one there is obtained 13,17α-diethyl-17β-hydroxygona-4,9-dien-3-one, nitrite.

EXAMPLE 33

13,17α-diethyl-3-methoxygona-1,3,5(10)-trien-17β-ol, nitrite

Following the procedure of Example 19, but substituting 13,17α-diethyl-3-methoxygona-1,3,5(10)-trien-17β-ol for 13,17α-diethyl-17β-hydroxygon-4-en-3-one there is obtained 13,17α-diethyl-3-methoxygona-1,3,5(10)-trien-17β-ol, nitrite.

EXAMPLE 34

13,17α-dipropyl-3-methoxygona-1,3,5(10)-trien-17β-ol, nitrite

Following the procedure of Example 19, but substituting 13,17α-dipropyl-3-methoxygona-1,3,5(10)-trien-17β-ol for 13,17α-diethyl-17β-hydroxygon-4-en-3-one there is obtained 13,17α-dipropyl-3-methoxygona-1,3,5(10)-trien-17β-ol, nitrite.

EXAMPLE 35

13,17α-dibutyl-3-methoxygona-1,3,5(10)-trien-17β-ol, nitrite

Following the procedure of Example 19, but substituting 13,17α-dibutyl-3-methoxygona-1,3,5(10)-trien-17β-ol for 13,17α-diethyl-17β-hydroxygon-4-en-3-one there is obtained 13,17α-dibutyl-3-methoxygona-1,3,5(10)-trien-17β-ol, nitrite.

EXAMPLE 36

13,17α-diethyl-3-ethoxygona-1,3,5(10)-trien-17β-ol, nitrite

Following the procedure of Example 19, but substituting 13,17α-diethyl-3-ethoxygona-1,3,5(10)-trien-17β-ol for 13,17α-diethyl-17β-hydroxygon-4-en-3-one there is obtained 13,17α-diethyl-3-ethoxygona-1,3,5(10)-trien-17β-ol, nitrite.

EXAMPLE 37

13,17α-diethyl-3-methoxy-8α-gona-1,3,5(10)-trien-17β-ol, nitrite

Following the procedure of Example 19, but substituting 13,17α-diethyl-3-methoxy-8α-gona-1,3,5(10)-trien-17β-ol for 13,17α-diethyl-17β-hydroxygon-4-en-3-one there is obtained 13,17α-diethyl-3-methoxy-8α-gona-1,3,5(10)-trien-17β-ol, nitrite.

EXAMPLE 38

13,17α-diethyl-3-cyclopentoxygona-1,3,5(10)-trien-17β-ol, nitrite

Following the procedure of Example 19, but substituting 13,17α-diethyl-3-cyclopentoxygona-1,3,5(10)-trien-17β-ol for 13,17α-diethyl-17β-hydroxygon-4-en-3-one there is obtained 13,17α-diethyl-3-cyclopentoxygona-1,3,5(10)-trien-17β-ol, nitrite.

It is understood that either the dl-steroids or the specific d- or l-isomers may be employed as starting materials with like results.

The invention may be variously otherwise embodied within the scope of the appended claims.

What is claimed is:

1. A compound in racemic form selected from the group consisting of those of the formulae:

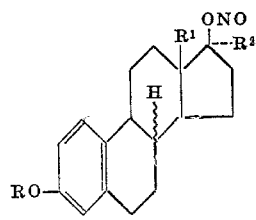

and

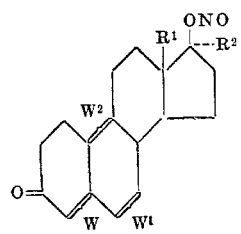

wherein R is selected from the group consisting of an alkyl of less than 5 carbon atoms and a cycloalkyl of 5 to 6 carbon atoms; $R^1$ is an alkyl group of 2 to 5 carbon atoms; $R^2$ is selected from the group consisting of hydrogen and an alkyl of less than 5 carbon atoms; W is selected from the group consisting of a double-bond and a saturated linkage between C4 and C5; $W^1$ is selected from the group consisting of a double-bond and a saturated linkage between C6 and C7; and $W^2$ is selected from the group consisting of a double-bond and a saturated linkage between C9 and C10; with the proviso that W, $W^1$, and $W^2$ together are selected from the group consisting of saturated linkages, a $\Delta^4$ linkage, a $\Delta^{4,6}$ linkage and a $\Delta^{4,9(10)}$ linkage.

2. A compound according to claim 1 having the structural formula:

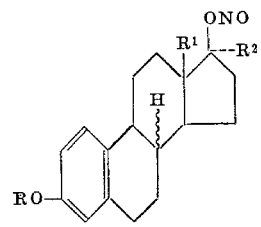

wherein R, $R^1$ and $R^2$ are as hereinbefore defined.

3. A compound according to claim 2 that is 13-ethyl-3-methoxygona-1,3,5(10)-trien-17β-ol, nitrite.

4. A compound according to claim 2 that is 13,17α-diethyl-3-methoxygona-1,3,5(10)-trien-17β-ol, nitrite.

5. A compound according to claim 2 that is 13-ethyl-3-methoxy-8α-gona-1,3,5(10)-trien-17β-ol, nitrite.

6. A compound according to claim 1 having the structural formula:

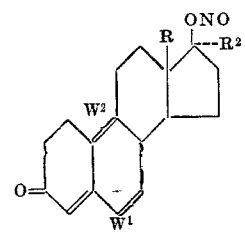

wherein $R^1$, $R^2$, $W^1$ and $W^2$ are as hereinbefore defined; but with the proviso that $W^1$ and $W^2$ are selected from the group consisting of saturated linkages, a $\Delta^6$ linkage and a $\Delta^{9(10)}$ linkage.

7. A compound according to claim 6 that is 13,17α-diethyl-17β-hydroxygon-4-en-3-one, nitrite.

8. A compound according to claim 6 that is 13-ethyl-17β-hydroxygon-4-en-3-one, nitrite.

9. A compound according to claim 6 that is 13-ethyl-17β-hydroxygona-4,6-dien-3-one, nitrite.

10. A compound according to claim 6 that is 13,17α-diethyl-17β-hydroxygona-4,6-dien-3-one, nitrite.

11. A compound according to claim 6 that is 13,17α-diethyl-17β-hydroxygona-4,9-dien-3-one, nitrite.

References Cited

UNITED STATES PATENTS 3,127,406   3/1964   Oliveto _____ 260—287

OTHER REFERENCES

Robinson et al., Journ. Amer. Chem. Soc., vol. 83, April 1961, pp. 1771–2.

Smith et al., Journ. Chem. Soc., November 1964, pp. 4472–4492, p. 4476.

Irmscher, Justus Liebig's Annalen der Chemie, Bd. 695, 1966, pp. 158–163.

LEWIS GOTTS, Primary Examiner

E. G. LOVE, Assistant Examiner

U.S. Cl. X.R.

260—397.5; 424—238, 243